United States Patent
Schmid

(10) Patent No.: US 12,059,988 B2
(45) Date of Patent: Aug. 13, 2024

(54) BODY-ADAPTABLE ARM REST ARRANGEMENT

(71) Applicant: Bayerische Motoren Werke Aktiengesellschaft, Munich (DE)

(72) Inventor: Bernhard Schmid, Hallbergmoos (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 357 days.

(21) Appl. No.: 17/594,812

(22) PCT Filed: Apr. 23, 2020

(86) PCT No.: PCT/EP2020/061362
§ 371 (c)(1),
(2) Date: Oct. 29, 2021

(87) PCT Pub. No.: WO2020/229135
PCT Pub. Date: Nov. 19, 2020

(65) Prior Publication Data
US 2022/0212582 A1    Jul. 7, 2022

(30) Foreign Application Priority Data
May 14, 2019   (DE) ............. 10 2019 112 622.3

(51) Int. Cl.
*B60N 2/00*    (2006.01)
*B60N 2/75*    (2018.01)
(52) U.S. Cl.
CPC .................... *B60N 2/77* (2018.02)

(58) Field of Classification Search
None
See application file for complete search history.

(56) References Cited

U.S. PATENT DOCUMENTS

| | | | |
|---|---|---|---|
| 4,763,860 A * | 8/1988 | Vauvelle | E02F 3/3609 244/118.5 |
| 4,793,583 A | 12/1988 | Bergacker et al. | |
| 9,844,268 B2 * | 12/2017 | DeJule | A47C 1/03 |
| 2013/0320693 A1 | 12/2013 | Schulz et al. | |
| 2017/0217342 A1 | 8/2017 | Grüdl et al. | |
| 2018/0050617 A1 | 2/2018 | Sundararajan et al. | |
| 2018/0304790 A1 | 10/2018 | Patil et al. | |

FOREIGN PATENT DOCUMENTS

| | | |
|---|---|---|
| CN | 103448593 A | 12/2013 |
| CN | 105620323 A | 6/2016 |
| CN | 107074135 A | 8/2017 |
| CN | 107757442 A | 3/2018 |
| CN | 109591668 A | 4/2019 |

(Continued)

OTHER PUBLICATIONS

International Search Report (PCT/ISA/210) issued in PCT Application No. PCT/EP2020/061362 dated Jul. 20, 2020 with English translation (five (5) pages).

(Continued)

*Primary Examiner* — Joseph D. Pape
(74) *Attorney, Agent, or Firm* — Crowell & Moring LLP

(57) ABSTRACT

A body-adaptable arm rest arrangement includes an arm rest having an actuation unit for adjusting different arm rest positions, and a base. The arm rest is connected to the base via the actuation unit.

14 Claims, 2 Drawing Sheets

(56) References Cited

FOREIGN PATENT DOCUMENTS

| | | | |
|---|---|---|---|
| DE | 198 48 952 A1 | 5/2000 | |
| DE | 10 2007 009 283 A1 | 9/2008 | |
| DE | 10 2008 050 953 A1 | 4/2010 | |
| DE | 20 2016 106 055 U1 | 11/2016 | |
| DE | 10 2017 213 169 A1 | 1/2019 | |
| DE | 10 2017 215 915 A1 | 3/2019 | |
| DE | 102017215915 A1 * | 3/2019 | |
| DE | 102020206764 A1 * | 12/2021 | |
| WO | WO-2019110286 A1 * | 6/2019 | ............... B60N 2/02 |

OTHER PUBLICATIONS

German-language Written Opinion (PCT/ISA/237) issued in PCT Application No. PCT/EP2020/061362 dated Jul. 20, 2020 (four (4) pages).

German-language Search Report issued in German Application No. 10 2019 112 622.3 dated Feb. 5, 2020 with partial English translation (10 pages).

English translation of Chinese Office Action issued in Chinese Application No. 202080033248.1 dated Feb. 1, 2023 (six (6) pages).

* cited by examiner

BODY-ADAPTABLE ARM REST ARRANGEMENT

BACKGROUND AND SUMMARY OF THE INVENTION

The invention relates to a body-adaptable armrest arrangement.

Such an arrangement is known from DE 10 2007 009 283 A1, although this involves merely a height-adjustable armrest in which an armrest arrangement is arranged, via a wedge, on a base surface and is designed to be height-adjustable.

The disadvantage of such an adjustable armrest can be considered, in particular, the fact that it allows only limited adaptation to a user's requirements, wherein in particular people of small stature can use such an armrest only to a very limited extent, if at all.

It is therefore the object of the present invention to provide an armrest arrangement having an armrest and an actuating device for setting different armrest positions. The armrest arrangement should make it possible to realize an entire range of adjustments with adjustment options in the upward and downward, forward and rearward directions and about a Y axis.

This object is achieved according to the invention by providing a body-adaptable armrest arrangement which comprises an armrest and an actuating device for setting different rest positions. The armrest here is connected to a base, for example in the form of a motor-vehicle bodyshell or of a seat frame, via the actuating device.

Height adjustment, inclination adjustment and length adjustment can be achieved as a result.

Accordingly, the body-adaptable armrest arrangement according to the invention is capable of meeting stringent requirements relating to use and comfort and also of adapting to a user's stature, irrespective of the position the user wants to assume or the position which he has already assumed in the seat.

The actuating device preferably has at least three actuators, wherein, in a further, particularly preferred embodiment, first and second actuators of the three actuators are connected in each case to first and second end points of the base and first and second end points of the armrest. The third actuator here is preferably connected to the second end of the base and the first end of the armrest, or, in an alternative embodiment, it is possible for the third actuator to be connected to the first end point of the base and, accordingly, to the second end point of the armrest.

In a particularly preferred embodiment, the armrest can be designed in the form of a central armrest or, as an alternative, in the form of a console.

The actuators can be designed, for example, in the form of spindle drives or cylinders, in particular hydraulic cylinders. In both cases, of course, necessary drives, for example electromotive drives, transmission elements and control units, are likewise provided as an option.

Further details, features and advantages of the invention can be gathered from the following description of exemplary embodiments with reference to the drawings.

DETAILED DESCRIPTION OF THE DRAWINGS

Figure 1:
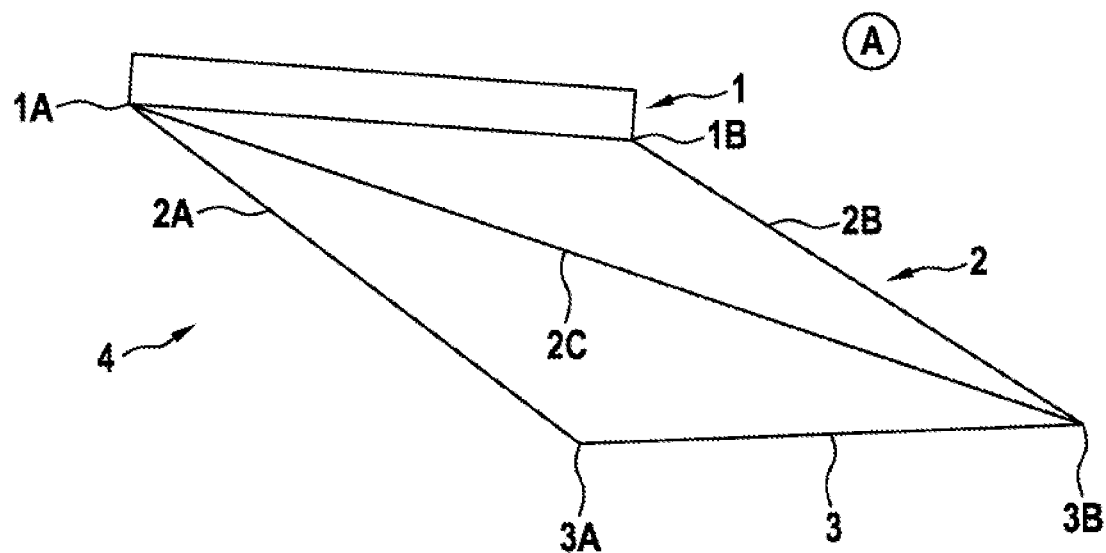
FIG. 1 is a schematically highly simplified illustration of a body-adaptable armrest arrangement according to an embodiment of the invention in a first position A.

The construction of a body-adaptable armrest arrangement 4 can be gathered, in particular, from the illustration of FIG. 1. The latter shows that the armrest arrangement 4 has an armrest 1, which can be, for example, a central armrest. The armrest arrangement 4 also has an actuating device 2, which is provided for setting different positions of the rest, wherein FIG. 1 illustrates the position defined by the letter A, wherein FIGS. 2 to 4 identify alternative positions using the letters B, C and D.

In the case of the inventive armrest arrangement 4, the actuating device 2 connects the armrest 1 to a base 3, which can be, for example, a bodyshell of a motor vehicle or a seat frame or the like.

In the case of the particularly preferred embodiment which is illustrated in FIG. 1, the actuating device has three actuators 2A, 2B and 2C.

The actuators 2A and 2B here are first and second actuators, respectively, which are fastened at first and second end points 3A, 3B of the base 3 and, at their other end, to first end points 1A and 1B of the armrest 1. Also provided is a third, central actuator 2C, which is arranged between the first actuator 2A and the second actuator 2B. As FIG. 1 depicts, this third actuator 2C runs along a diagonal and, accordingly, is connected to the first end 1A of the armrest 1 and the second end or end point 3B of the base 3.

It would also be possible, in principle, for the third actuator 2C to be connected to the first end point 3A of the base 3 and, accordingly, in this case to the second end point 1B of the armrest 1.

If the actuators 2A to 2C are designed in the form of cylinders, the piston rods thereof, depending on the position which the armrest 1 is to assume or has assumed, are retracted and/or extended in order to actuate the armrest 1 for height adjustment, inclination adjustment or length adjustment.

Figure 2:
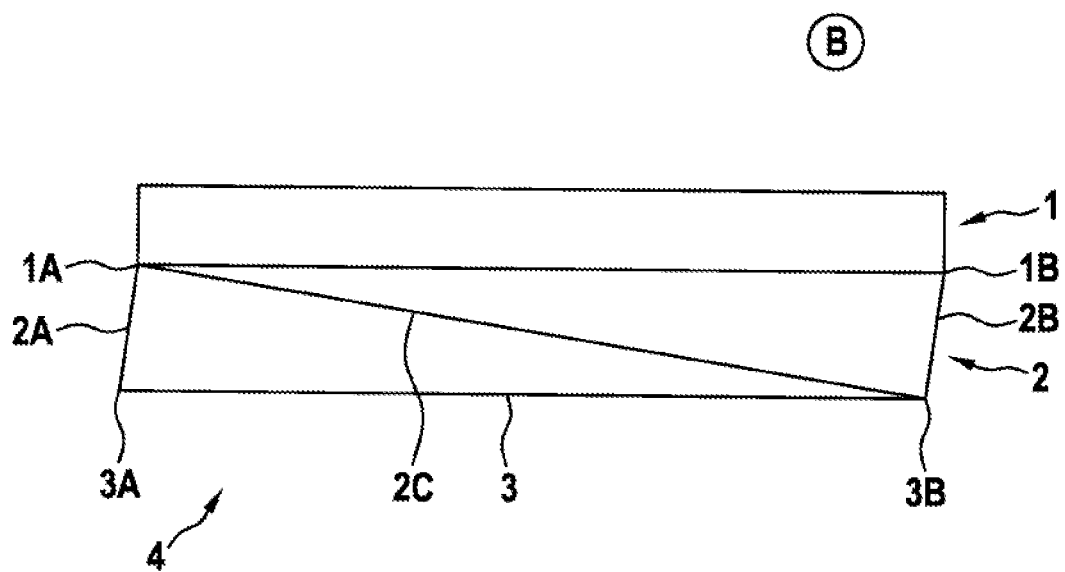
FIG. 2 is an illustration which corresponds to FIG. 1 and depicts the armrest arrangement in a position B.

Thus, FIG. 2 shows the armrest 1 lowered in the direction of a bench seat (not illustrated specifically in FIG. 2). The lowering of the armrest makes it possible for items to be pushed through on the bench seat.

Figure 3:
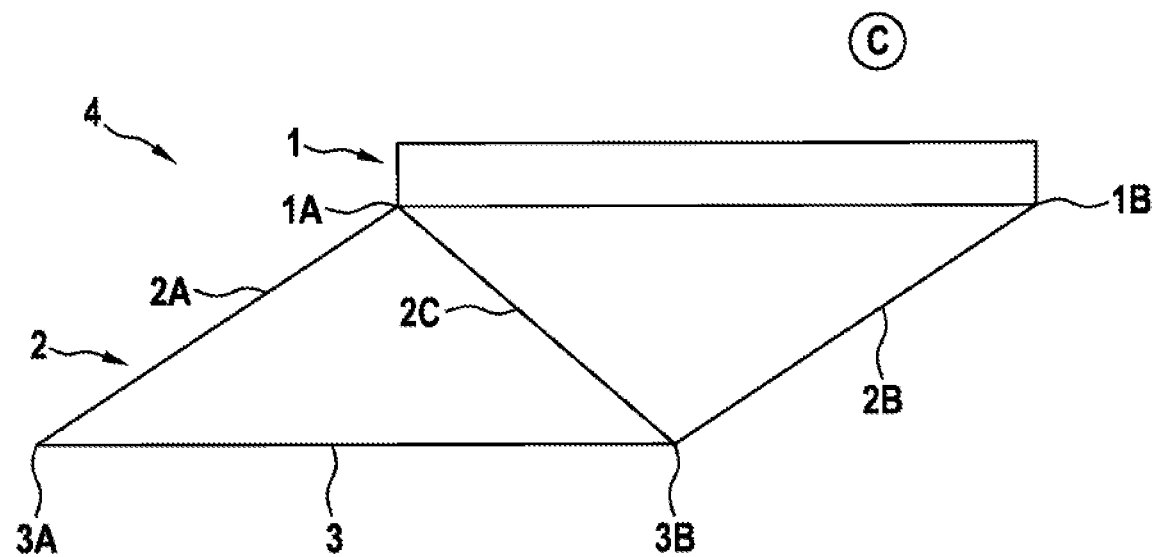
FIG. 3 is a further schematically highly simplified illustration, which corresponds to FIGS. 1 and 2 and depicts the armrest arrangement in a position C.

FIG. 3 shows the position C, in which the armrest 1 has been displaced rearward, as seen in the direction of travel of the vehicle (not illustrated in FIG. 3), that is to say to a rear region of the passenger compartment. This means that the armrest 1 becomes an element of interaction between the front and rear rows of seats. For example, items positioned on the armrest can thus be passed from front to rear.

Figure 4:
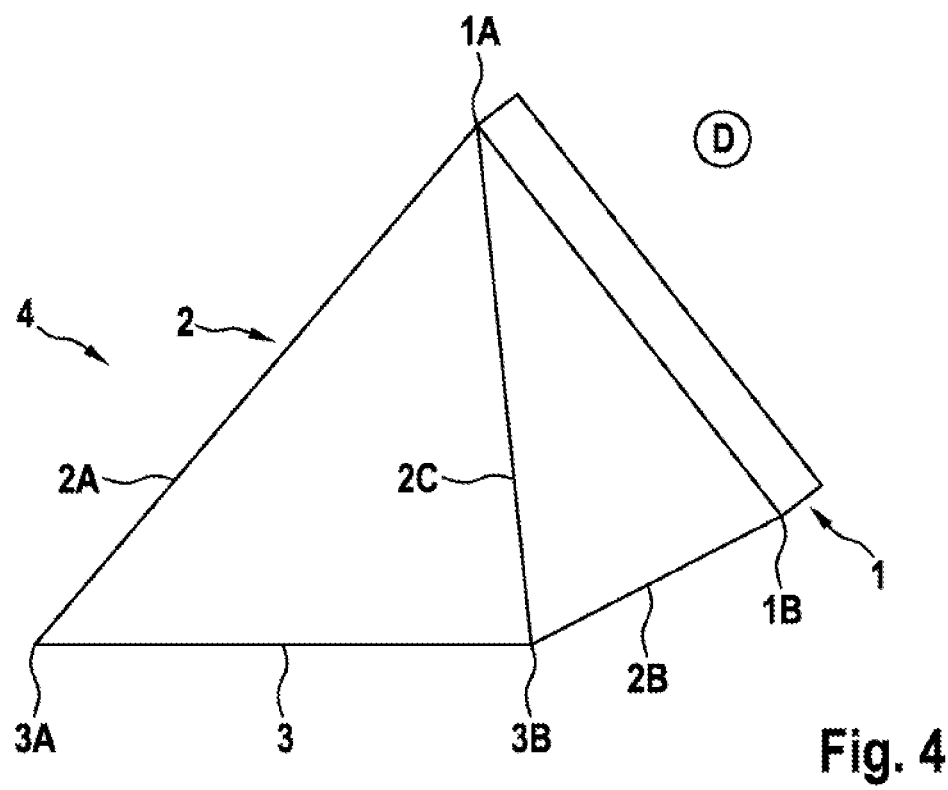
FIG. 4 is an illustration which corresponds to FIGS. 1 to 3 and depicts the armrest arrangement in a position D.

FIG. 4 depicts the position D, in which the armrest 1 has been raised and inclined by the appropriate setting of the actuators 2A to 2C, in order to render accessible for example a glove compartment which is arranged beneath the base 3. The armrest 1 can thus perform a cover function, e.g. for the aforementioned glove compartment.

In addition to the written disclosure of the invention above, reference is hereby explicitly made, as an addition to the disclosure of the invention, to the illustration provided by the drawings of the invention in FIGS. 1 to 4.

LIST OF REFERENCE SIGNS

1 Armrest
1A, 1B End points of the armrest 1
2 Actuating device
2A to 2C Actuators
3 Base
3A, 3B End points of the base 3
4 Armrest arrangement
A, B, C, D Armrest positions

What is claimed is:

1. A body-adaptable armrest arrangement, comprising:
an armrest;
an actuating device for setting different armrest positions; and
a base connected to the armrest via the actuating device,
wherein the actuating device comprises a first actuator and a second actuator,
wherein the first actuator and the second actuator are outer actuators fastened at first and second end points of the base and first and second endpoints of the armrest, and
wherein a third actuator is connected to the second end point of the base and the first end point of the armrest.

2. The armrest arrangement according to claim 1, wherein the armrest is a central armrest of a vehicle.

3. The armrest arrangement according to claim 1, wherein the armrest is a console of a vehicle.

4. The armrest arrangement according to claim 1, wherein the actuators are spindle drives.

5. The armrest arrangement according to claim 1, wherein the actuators are in the form of cylinders.

6. The armrest arrangement according to claim 1, wherein the base is designed in the form of a bodyshell of a motor vehicle.

7. The armrest arrangement according to claim 1, wherein the base is designed in the form of a seat frame.

8. A body-adaptable armrest arrangement, comprising:
an armrest;
an actuating device for setting different armrest positions; and
a base connected to the armrest via the actuating device,
wherein the actuating device comprises a first actuator and a second actuator,
wherein the first actuator and the second actuator are outer actuators fastened at first and second end points of the base and first and second endpoints of the armrest, and
wherein a third actuator is connected to the first end point of the base and the second end point of the armrest.

9. The armrest arrangement according to claim 8, wherein the armrest is a central armrest of a vehicle.

10. The armrest arrangement according to claim 8, wherein the armrest is a console of a vehicle.

11. The armrest arrangement according to claim 8, wherein the actuators are spindle drives.

12. The armrest arrangement according to claim 8, wherein the actuators are in the form of cylinders.

13. The armrest arrangement according to claim 8, wherein the base is designed in the form of a bodyshell of a motor vehicle.

14. The armrest arrangement according to claim 8, wherein the base is designed in the form of a seat frame.

* * * * *